United States Patent [19]

Wakita et al.

[11] Patent Number: 5,009,815
[45] Date of Patent: Apr. 23, 1991

[54] COMPOSITION OF NONLINEAR OPTICAL MATERIALS AND A METHOD FOR PREPARING THE SAME

[75] Inventors: Katsuya Wakita, Moriguchi; Nobuo Sonoda, Settsu; Tokihiko Shimizu, Nara; Shu Hotta, Kawasaki; Mamoru Soga, Osaka, all of Japan

[73] Assignee: Matsushita Electric Industrial Co., Ltd., Osaka, Japan

[21] Appl. No.: 478,230

[22] Filed: Feb. 9, 1990

[30] Foreign Application Priority Data

| Feb. 22, 1989 | [JP] | Japan | 1-42389 |
| Feb. 23, 1989 | [JP] | Japan | 1-43760 |
| Mar. 30, 1989 | [JP] | Japan | 1-80359 |
| May 16, 1989 | [JP] | Japan | 1-122187 |
| May 16, 1989 | [JP] | Japan | 1-122188 |

[51] Int. Cl.$^5$ .................. F21V 9/00; C09K 19/52; G02B 5/23
[52] U.S. Cl. .................. 252/582; 252/299.01; 350/354; 564/305; 564/306; 564/368; 307/425; 428/1
[58] Field of Search .................. 252/582, 299.01; 564/305, 306, 384, 368; 307/425; 350/354; 428/1

[56] References Cited

U.S. PATENT DOCUMENTS

| 4,659,177 | 4/1987 | Choe et al. | 350/96.34 |
| 4,867,538 | 9/1989 | Yoon et al. | 350/350 R |
| 4,894,263 | 1/1990 | Dubois et al. | 428/1 |
| 4,898,691 | 2/1990 | Borzo | 252/589 |
| 4,925,589 | 5/1990 | Lorenz | 252/299.01 |

OTHER PUBLICATIONS

*Highly Efficient Second Harmonic Generation in p–Nitroaniline/Poly(lactone) Systems,* Japanese Journal of Applied Physics, vol. 27, No. 9, pp. L1724–L1725, Sep., 1988, T. Miyazaki, T. Watanabe, S. Miyata.

*Large Second Harmonic Generation in Electrically Ordered p–Nitroaniline–Poly(oxyethylene) "Guest–Host" Systems,* J. Chem. Soc., Chem. Commun., 1988, pp. 250–251, T. Watanabe, K. Yoshinaga, D. Fichou, S. Miyata.

Primary Examiner—Richard D. Lovering
Assistant Examiner—Cynthia Harris
Attorney, Agent, or Firm—Ratner & Prestia

[57] ABSTRACT

A composition of nonlinear optical materials is disclosed which comprises two or more organic compounds, at least one of which is a first organic compound with a $\pi$-electron conjugated system containing an electron-donative substituent group and an electron-attractive substituent group.

7 Claims, 9 Drawing Sheets

COMPOSITION OF NONLINEAR OPTICAL MATERIALS AND A METHOD FOR PREPARING THE SAME

BACKGROUND OF THE INVENTION

1. Field of the Invention

This invention relates to a composition of nonlinear optical materials which can be applied to the construction of various optical devices and a method for preparing the composition.

2. Description of the Prior Art

Materials exhibiting substantial nonlinear optical effects and capable of rapid response are required as photonics materials for use in the optical devices of the future, and therefore extensive investigations and research have been conducted in connection with the development of such materials. As possibilities for such materials, organic compounds with a $\pi$-electron conjugated system are regarded as more promising than crystalline inorganic compounds wherein lattice vibrations are involved in optical behavior. An effective and generally adopted approach to the molecular design of such organic materials consists in introducing strongly electron-donative and electron-attractive substituent groups into a molecule having a $\pi$-electron conjugated system. At present, many compounds synthesized in accordance with this approach have been studied. In addition, as examples of the use of polymers for such purposes, materials have been prepared by dispersing molecules with a $\pi$-electron conjugated system containing electron-donative and electron-attractive substituent groups in polyoxyethylene or polyester resins, and second harmonic generation (SHG) has been observed in such materials (see e.g., Japanese Journal of Applied Physics, 27, 9, 1724 (1988); J. Chem. Soc., Chem. Commun., 250 (1988)).

However, the aforesaid approach to molecular design entails the construction of molecules with extremely large dipole moments. Consequently, owing to strong interactions between these dipole moments, considering the case of two-molecule interactions, for example, these molecules are prone to form centrosymmetric crystals such that the dipole moments of paired molecules mutually cancel. In particular, the dipole moment is usually largest in such a compound that electron-donative and electron-attractive substituent groups are located at mutually parapositions on an aromatic ring, but this compound is correspondingly very prone to the formation of centrally symmetric crystals. This constitutes a problem, since such centrally symmetric crystals do not exhibit the secondary nonlinear optical effect (SHG). Furthermore, if the aforesaid compounds are dispersed in a polymer, then an electric field must be applied thereto in order to orient the molecules. Also, a problem of temporal stability arises over time. Moreover, the dispersed systems so produced may lack adequate transparency.

SUMMARY OF THE INVENTION

The composition of nonlinear optical materials of this invention, which overcomes the above-discussed and numerous other disadvantages and deficiencies of the prior art, comprises two or more organic compounds, at least one of which is a first organic compound with a $\pi$-electron conjugated system containing an electron-donative substituent group and an electron-attractive substituent group.

In a preferred embodiment, at least two of the organic compounds exhibit different crystal structures from each other.

In a preferred embodiment, the above-mentioned composition of nonlinear optical materials comprises a second organic compound of the general formula:

$$R_1-N(R_2)-R_3-N(R_2)-R_1 \quad (I)$$

wherein each $R_1$ is independently selected from the group consisting of hydrogen, any substituent group, and unsubstituted or substituted aromatic or heterocyclic rings, with the proviso that at least one $R_1$ is an unsubstituted or substituted aromatic or heterocyclic ring; each $R_2$ is independently hydrogen or any substituent group; and $R_3$ is a linear or branched alkylene group.

In a preferred embodiment, the first organic compound has an aromatic ring on which the electron-donative and the electron-attractive substituent groups are located at mutually para-positions.

In a preferred embodiment, the first organic compound is nitroaniline.

The method for preparing a composition of nonlinear optical materials of this invention comprises the steps of: mixing two or more organic compounds which includes at least one organic compound with a $\pi$-electron conjugated system containing an electron-donative substituent group and an electron-attractive substituent group; and forming a composition of nonlinear optical materials from the mixture.

In a preferred embodiment, the composition of nonlinear optical materials is formed by the use of a technique selected from the group consisting of fusion, solution, and vapor deposition.

In a preferred embodiment, the two or more organic compounds are mixed by fusion and the mixture is then solidified by cooling at a rate of at least 0.02° C./sec.

In a more preferred embodiment, the mixture is solidified by cooling at a rate of at least 1° C./sec.

Thus, the invention described herein makes possible the objectives of (1) providing a composition of nonlinear optical materials which can exhibit large nonlinear optical effects; (2) providing a composition of nonlinear optical materials which can be prepared without crystallization under an applied electric field (i.e., poling), and therefore has excellent temporal stability as compared with conventional compositions obtained by the method of dispersing nonlinear optical materials in polymers; and (3) providing a method for preparing a composition of nonlinear optical materials having these excellent characteristics.

The present inventors have discovered that highly-efficient SHG can be obtained by combining organic compounds with a $\pi$-electron conjugated system, the crystals of which, when used alone, exhibit merely weak or no SHG, with other organic compounds (excluding polymers). In cases where, in the aforesaid organic compounds with a $\pi$-electron conjugated system, electron-donative and electron-attractive substituent groups are located at mutually para-positions on an aromatic ring, then the dipole moment of the compound is large as compared with that resulting from other relative positions of these substituent groups, and are therefore likely to exhibit highly-efficient SHG. Moreover, among the aforesaid organic compounds with a π-electron conjugated system, nitroaniline derivatives with an amino group as the electron-donative substituent group and a nitro group as the electron-attractive substituent group give great values of the superpolarizability β at the molecular level, and therefore may be expected to provide highly-efficient SHG. However, this type of compound with a π-electron conjugated system is prone to form centrally symmetric crystals, and therefore such compounds when used alone are ordinarily SHG inactive. The inventors have discovered that, by combining compounds of different structures with these optical compounds having a π-electron conjugated system which are regarded as potentially SHG active (i.e., giving great values of β at the molecular level), compositions with structures so modified as to exclude central symmetry (i.e., SHG active structures) can be obtained.

As regards the structures of these compositions, although details have not yet been elucidated, these appear to contain solid solutions, mixed crystals, or eutectic mixtures with structures such that the dipole moments of the individual molecules do not mutually cancel (i.e., non-centrally symmetric structures). Another possibility is the formation, by two or more molecular species, of complexes or molecular compounds which are assumed to have a noncentrosymmetric form.

In accordance with the present invention, a composition of nonlinear optical materials having highly-efficient SHG activity can be prepared, even using compounds formerly regarded as SHG inactive, or compounds exhibiting but weak SHG activity. Thus, the fields of application of such a composition will be vastly enlarged.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
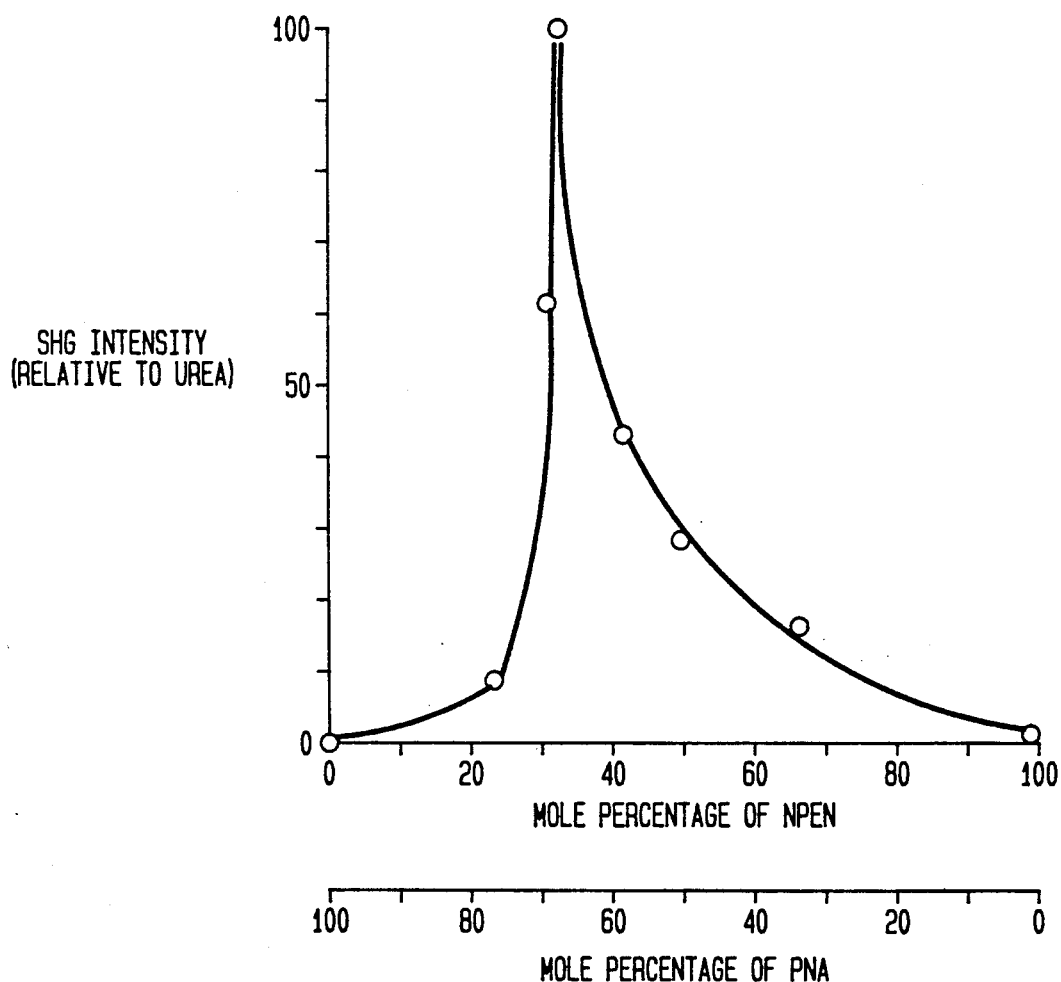
FIG. 1 is a graph showing the relationship between the SHG intensity and the mole percentages of NPEN and PNA in the PNA/NPEN system (i.e., compositions of nonlinear optical materials obtained in Example 1 of this invention).

The composition of nonlinear optical materials of this invention comprises two or more organic compounds, at least of which is a first organic compound with a π-electron conjugated system containing an electron-donative substituent group and an electron-attractive substituent group.

Examples of the first organic compound which can be used herein, i.e., compounds with a π-electron conjugated system, include aromatic compounds containing electron-donative and electron-attractive substituent groups, such as nitroaniline derivatives, conjugated olefin compounds such as stilbene derivatives and benzalacetophenone derivatives, heterocyclic compounds such as benzo-oxadiazole derivatives, nitropyridine derivatives, pyrimidine derivatives, and Schiff base compounds having an aromatic ring, such as benzylideneaniline derivatives. Specific examples of the first organic compounds are p-nitroaniline, o-nitroaniline, m-nitroaniline, 2-nitro-5-aminopyridine, 3-nitro-5-aminopyridine, and 2-amino-5-nitropyrimidine. In addition, the following compounds can also be used: 1,4-substituted naphthalene derivatives, 4-dimethylamino-4-stilbene, 3-(4-methoxyphenyl)-1-(4-aminophenyl)-2-propen-1-one, chalcone and derivatives thereof, 4-nitro-7-chlorobenzoxdiazole, 4'-nitrobenzylidene-3-acetylamino-4-methoxyaniline, N-(4-pyridinylmethylene)-4-dimethylaminobenzenamine di-methylsulfate, N-[2-(5-nitrofurfurylidene)]-4-methoxybenzenamine, and the like. Among these, nitroaniline derivatives are particularly preferred, as being easily prepared and having absorption limits corresponding to relatively short wavelengths.

Examples of the electron-donative substituent groups are amino groups such as amino, monomethylamino, dimethylamino, diethylamino, n-butylamino, and t-butylamino; optically active groups such as L-(2-hydroxymethyl)-pyrrolidyl, L-alanyl, L-seryl, and L-tyrosyl; hydroxy and alkoxy groups such as methoxy, ethoxy, and n-butoxy; linear or branched alkyl groups such as methyl, ethyl, n-propyl, n-butyl, n-pentyl, and n-octadecyl; and halogen. Examples of the electron-attractive substituent groups are nitro; cyano; isocyanato; acyl groups such as formyl and acetyl, alkoxycarbonyl groups such as methylcarbonyl and ethylcarbonyl; sulfonyl; and halogen. Halogens have both electron-donative and electron-attractive properties, and are therefore applicable in either category.

The aforesaid first compound, with a π-electron conjugated system containing electron-donative and electron-attractive substituent groups, is combined with a second organic compound. Examples of the second organic compound include N,N-diethylnitroaniline and 4-nitro-N-isopropylaniline. Moreover, analogues of organic compounds with a π-electron conjugated system are also applicable. The organic compounds represented by the following general formula I are particularly preferred because they exhibit excellent stabilization of highly-efficient SHG:

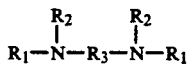
(I)

wherein each $R_1$ is independently selected from the group consisting of hydrogen, any substituent group, and unsubstituted or substituted aromatic or heterocyclic rings, with the proviso that at least one $R_1$ is an unsubstituted or substituted aromatic or heterocyclic ring; each $R_2$ is independently hydrogen or any substituent group; and $R_3$ is a linear or branched alkylene group.

Examples of any substituent groups mentioned above are amino, substituted amino, hydroxy, alkoxy, linear or branched alkyl, nitro, cyano, and halogen. The above-mentioned aromatic and heterocyclic rings can also have these substituent groups.

Specific examples of the second organic compounds of the general formula I are N-(p-nitrophenyl)ethylenediamine, N,N'-bis(p-nitrophenyl)-1,2-diaminoethane, N-(2-nitropyridyl)ethylenediamine, N-(2-nitropyridyl)propylenediamine, N-(5-nitropyrimidyl)ethylenediamine, N-phenyl-ethylenediamine, N,N'-diphenyl-1,2-diaminoethane, N,N'-bis(p-nitro-phenyl)-2-methyl-1,2-diaminoethane, (R)-N,N'-bis(p-nitrophenyl)-1-phenyl-1,2-diaminoethane, N,N'-bis(p-nitrophenyl)-1,3-diaminopropane, N-(p-nitrophenyl)-1,3-diaminopropane, N-(p-nitrophenyl)-2-methyl-1,2-diaminoethane, N,N-bis(p-nitrophenyl)-1,4-diaminobutane, and N,N-bis(p-nitrophenyl)-2,2-dimethyl-1,3-diaminopropane.

The SHG active compositions of this invention are prepared by the use of techniques such as fusion, solution, or vapor deposition to effect mixing of the aforesaid two or more organic compounds at the molecular level, in either the liquid phase (melts or solutions) or the gaseous phase. If these two or more organic compounds are mixed by fusion and the mixture subsequently solidified by cooling, the cooling rate should preferably be at least 0.02° C./sec, and, more preferably, at least 1° C./sec.

The invention will be further explained by reference to the following examples.

EXAMPLE 1

First, p-nitroaniline (hereinafter referred to as PNA; available from Kanto Kagaku Co., Ltd.) and N-(p-nitrophenyl)ethylenediamine (hereinafter referred to as NPEN; synthesized in accordance with the method described in J. Org. Chem. 10, 283–285 (1945); mp 144°–145° C.) in powder form were mixed in various molar ratios, and each such mixture was fused by heating on a Petri dish. After stirring to form a uniform phase, this melt was solidified by cooling at the rate of 1° C./sec, thereby obtaining the desired composition of nonlinear optical materials.

The SHG efficiency of the compositions so obtained was measured by the powder method (Kurz, J. Appl. Phys., 39, 3978 (1968)). As shown in FIG. 1, an extremely high SHG efficiency (about 100 times relative to urea) was observed when the molar ratio of PNA to NPEN was in the neighborhood of 2:1. The fact that neither of the aforesaid compounds alone exhibits any significant SHG (i.e., SHG is completely unobserved in PNA, and no more than extremely minute SHG is observed in NPEN) indicates that the mixing and melting of these two compounds results in the formation of new compositions with structures which exhibit extremely high SHG efficiency.

Figure 2:
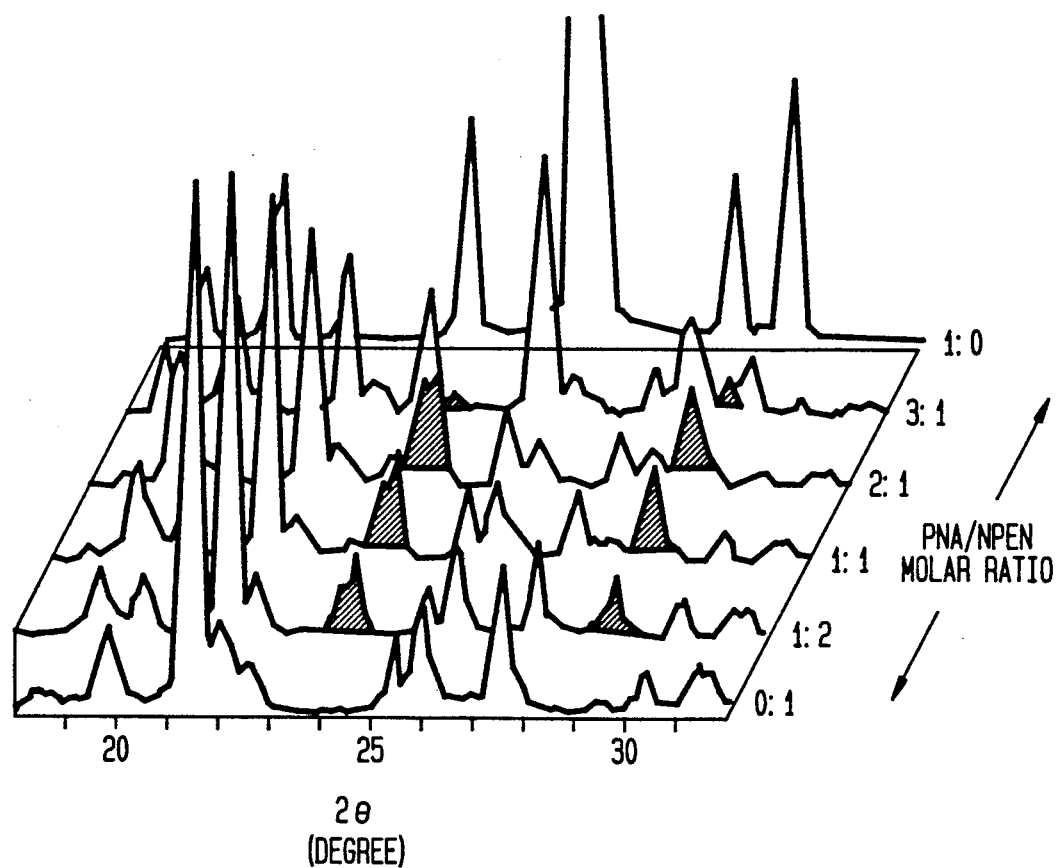
FIG. 2 is of characteristic curves showing the results of powder X-ray analysis of the PNA/NPEN system mentioned above.

FIG. 2 shows the results of powder X-ray analysis of the compositions of this example prepared with various molar ratios. As is clearly indicated by this figure, new peaks were observed, different from those displayed by either PNA or NPEN alone, and the fact that these diffraction peaks were maximal for PNA/NPEN ratios in the neighborhood of 2:1 indicates that these new peaks arise from SHG active compositions.

As regards the structures of these compositions, although details have not yet been elucidated, these appear to contain solid solutions, mixed crystals, or eutectic mixtures with structures such that the dipole moments of the individual molecules do not mutually cancel (i.e., non-centrally symmetric structures). Another possibility is the formation, by two or more molecular species, of complexes or molecular compounds which assume configurations without central symmetry. However, all parts of the compositions obtained in this example are not necessary SHG active, and inactive portions are also believed to be contained in these compositions.

Figure 3:
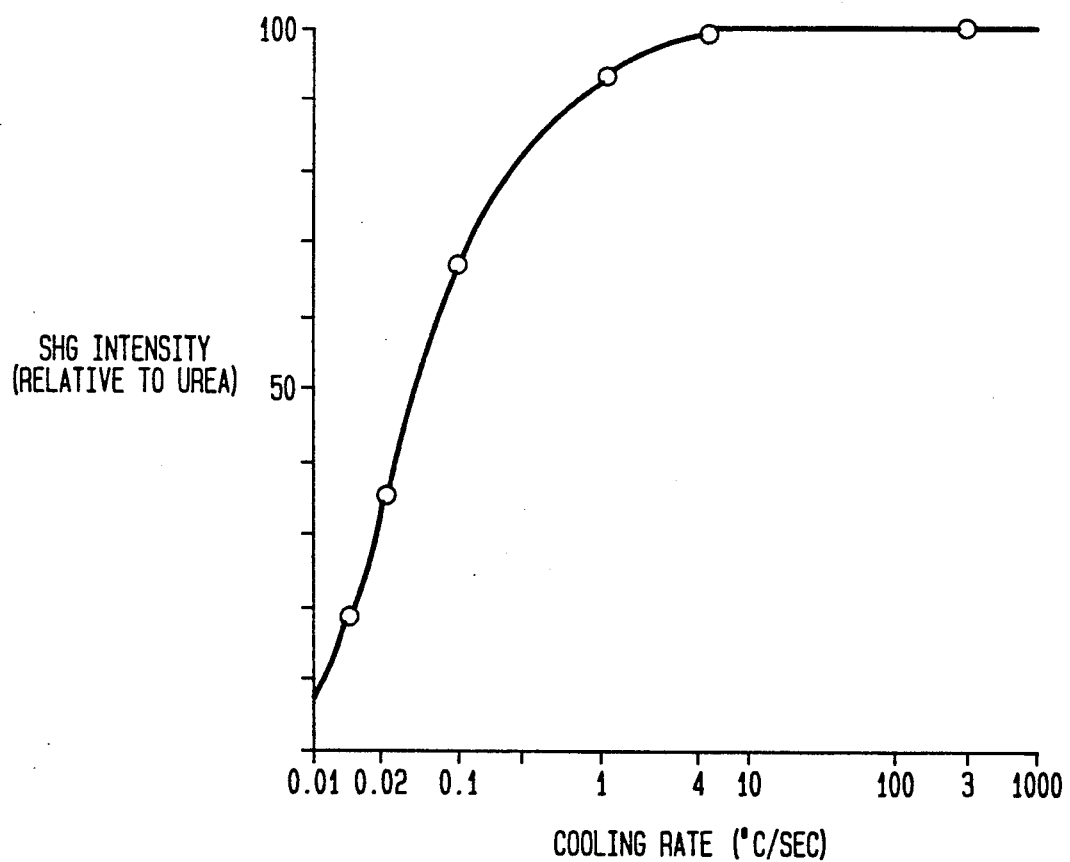
FIG. 3 is a graph showing the relationship between the SHG intensity and the cooling rate in the PNA/NPEN system mentioned above.

Also, as shown in FIG. 3, the rate of cooling used when the compositions of this example are prepared is related to the SHG intensity. This figure indicates that, in order to achieve highly-efficient SHG, the cooling rate should preferably be at least 0.02° C./sec, and, more preferably, at least 1° C./sec.

EXAMPLE 2

A mixture of PNA and NPEN in the molar ratio 1:1 was dissolved by heating in methanol, after which the desired composition of nonlinear optical materials was then obtained by cooling this mixture (mixed recrystallization). The SHG efficiency of the composition so obtained was then measured by the powder method, and found to give the high value of 15 times relative to urea.

EXAMPLE 3

Various compositions of nonlinear optical materials were prepared by the same method as used in Example 1, except that the ingredients used in the present case were PNA and N-(p-nitrophenyl)propylenediamine (hereinafter referred to as NPPN; synthesized by the same method as used for the synthesis of NPEN in Example 1). The structure of the latter compound is represented by the formula:

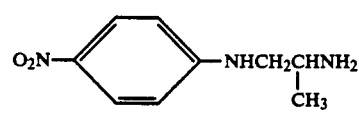

Figure 4:
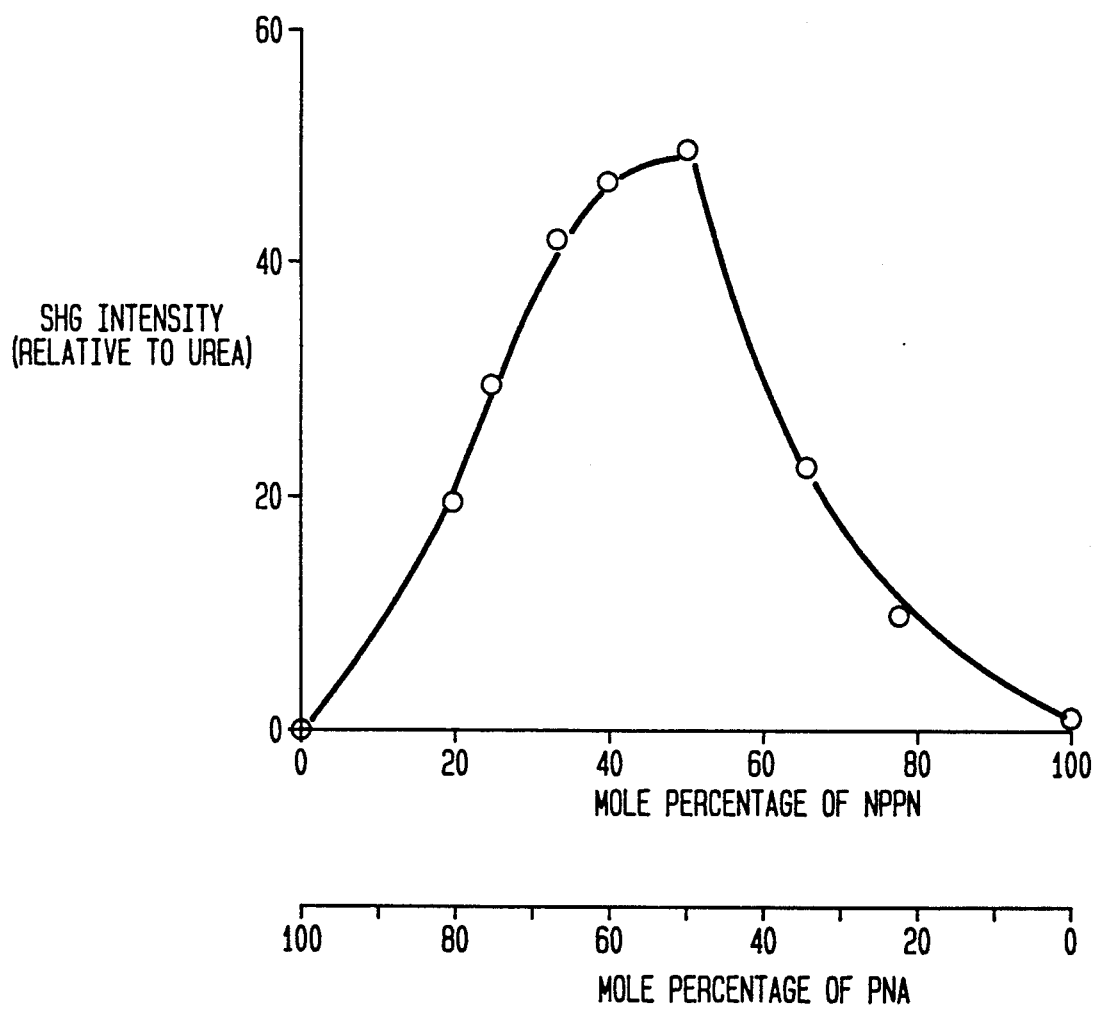
FIG. 4 is a graph showing the relationship between the SHG intensity and the mole percentages of NPPN and PNA in the PNA/NPPN system (i.e., compositions of nonlinear optical materials obtained in Example 3 of this invention).

The SHG efficiency of the compositions so obtained was then measured by the powder method. As shown in FIG. 4, extremely high SHG efficiency (about 50 times relative to urea) was observed for PNA/NPPN ratios in the neighborhood of 1:1. The fact that neither of the aforesaid compounds alone exhibits any significant SHG (i.e., SHG is completely unobserved in PNA, and no more than extremely minute SHG is observed in NPPN) indicates that the mixing and melting of these two compounds results in the formation of new compositions with structures which exhibit extremely high SHG efficiency.

EXAMPLE 4

Various compositions of nonlinear optical materials were prepared by the same method as used in Example 1, except that the ingredients used in the present case were PNA and N-(p-nitrophenyl)trimethylenediamine (hereinafter referred to as NPTN; synthesized by the same method as used for the synthesis of NPEN in Example 1). The structure of the latter compound is represented by the formula:

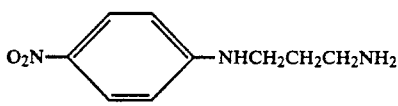

Figure 5:
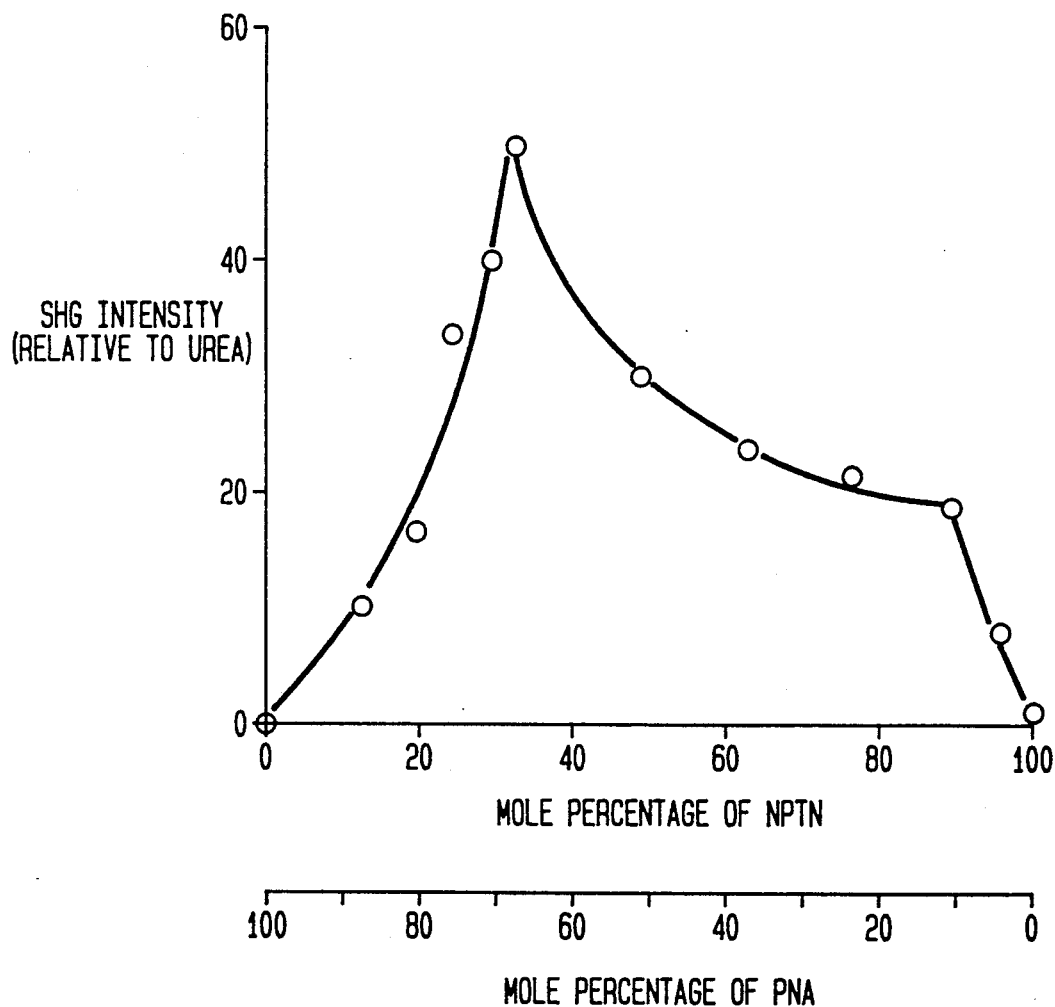
FIG. 5 is a graph showing the relationship between the SHG intensity and the mole percentages of NPTN and PNA in the PNA/NPTN system (i.e., compositions of nonlinear optical materials obtained in Example 4 of this invention).

The SHG efficiency of the compositions so obtained was then measured by the powder method. As shown in FIG. 5, extremely high SHG efficiency (about 50 times relative to urea) was observed for PNA/NPTN ratios in the neighborhood of 2:1.

EXAMPLE 5

PNA and N-(p-nitrophenyl)-2-phenylethylenediamine (hereinafter referred to as NPPEN; synthesized by the same method as used for the synthesis of NPEN in Example 1) in powder or were mixed in various molar ratios, and each such mixture was dissolved with acetone in a beaker. The structure of NPPEN is represented by the formula:

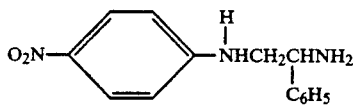

The solution so obtained was added dropwise to petroleum ether while stirring, thus reprecipitating the solutes, and thereby, the desired composition of nonlinear optical materials was obtained.

Figure 6:
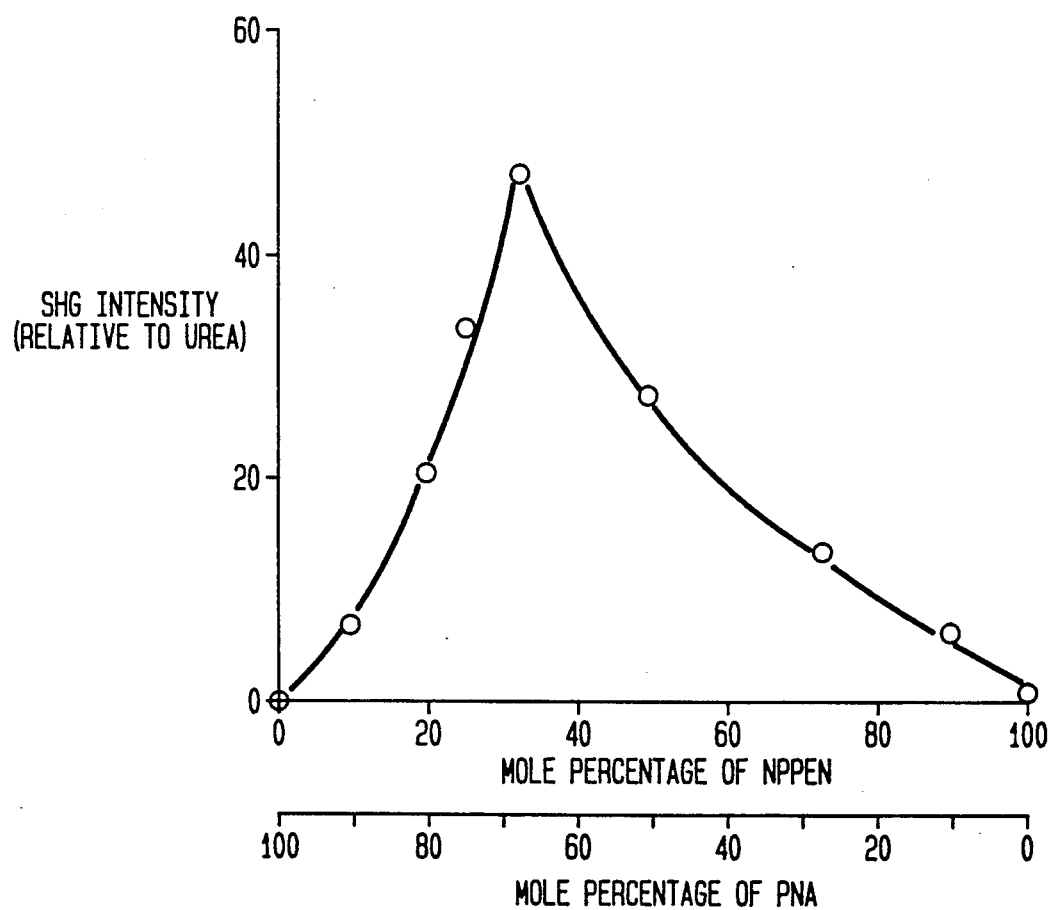
FIG. 6 is a graph showing the relationship between the SHG intensity and the mole percentages of NPPEN and PNA in the PNA/NPPEN system (i.e., compositions of nonlinear optical materials obtained in Example 5 of this invention).

The SHG efficiency of the compositions so obtained was then measured by the powder method. As shown in FIG. 6, extremely high SHG efficiency (about 45 times relative to urea) was observed for PNA/NPPEN ratios in the neighborhood of 2:1.

EXAMPLE 6

Various compositions of nonlinear optical materials were prepared by the same method as used in Example 1, except that the ingredients used in the present case were PNA and N,N'-diphenylethylenediamine (hereinafter referred to as DPEN; available from Tokyo Kasei, Ltd.).

Figure 7:
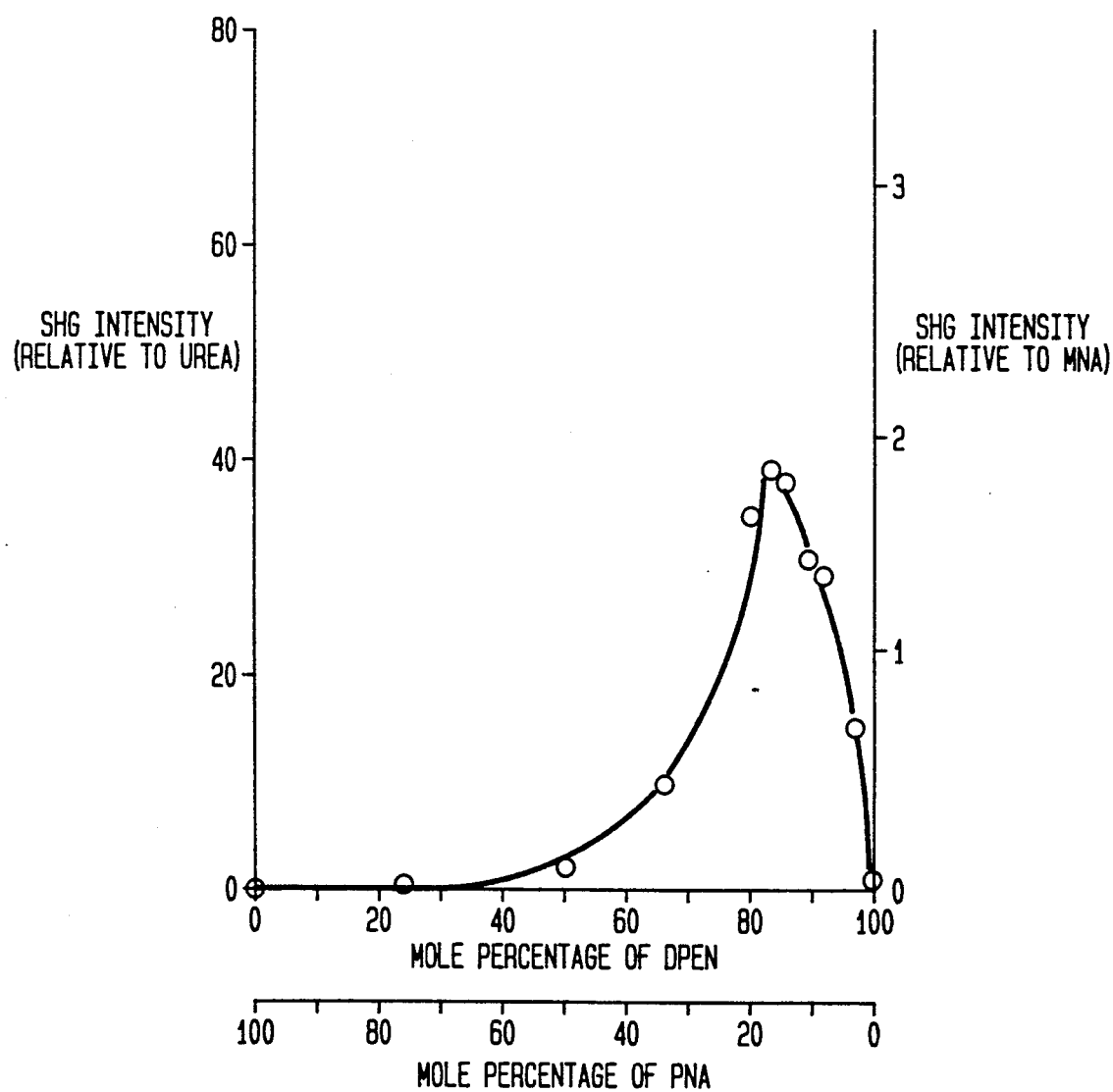
FIG. 7 is a graph showing the relationship between the SHG intensity and the mole percentages of DPEN and PNA in the PNA/DPEN system (i.e., compositions of nonlinear optical materials obtained in Example 6 of this invention).

The SHG efficiency of the compositions so obtained was then measured by the powder method. As shown in FIG. 7, extremely high SHG efficiency (about 40 times relative to urea) was observed for PNA/DPEN ratios in the neighborhood of 1:5. The fact that neither of the aforesaid compounds alone exhibits any SHG whatsoever indicates that the mixing and melting of these two compounds results in the formation of new compositions with structures which exhibit extremely high SHG efficiency.

EXAMPLE 7

A composition of nonlinear optical materials was prepared by the same method as used in Example 1, except that the ingredients used in the present case were PNA and N,N'-bis(p-nitrophenyl)ethylenediamine (hereinafter referred to as DNPEN; synthesized in accordance with the method of R. L. Lantz, Bull. Soc. Chim. France, 311–317 (1956); mp 221°–222° C.), mixed in the molar ratio 1:1.

The SHG efficiency of the composition so obtained, when measured by the powder method, gave the high value of 27 times relative to urea. No SHG whatsoever was observed in either PNA or DNPEN alone.

EXAMPLE 8

N,N'-bis(p-nitrophenyl)propylenediamine (i.e., N,N'-bis(p-nitrophenyl)-1-methyl-1,2-diaminoethane; hereinafter referred to as DNPPN) was synthesized in accordance with the method of the reference cited in the above description of Example 7. DNPPN and PNA in powder form were mixed in various molar ratios, and each such mixture was dissolved with acetone in a beaker. The solution so obtained was poured into a large quantity of petroleum ether, thus reprecipitating the solutes, and thereby, the desired composition of nonlinear optical materials was obtained.

Figure 8:
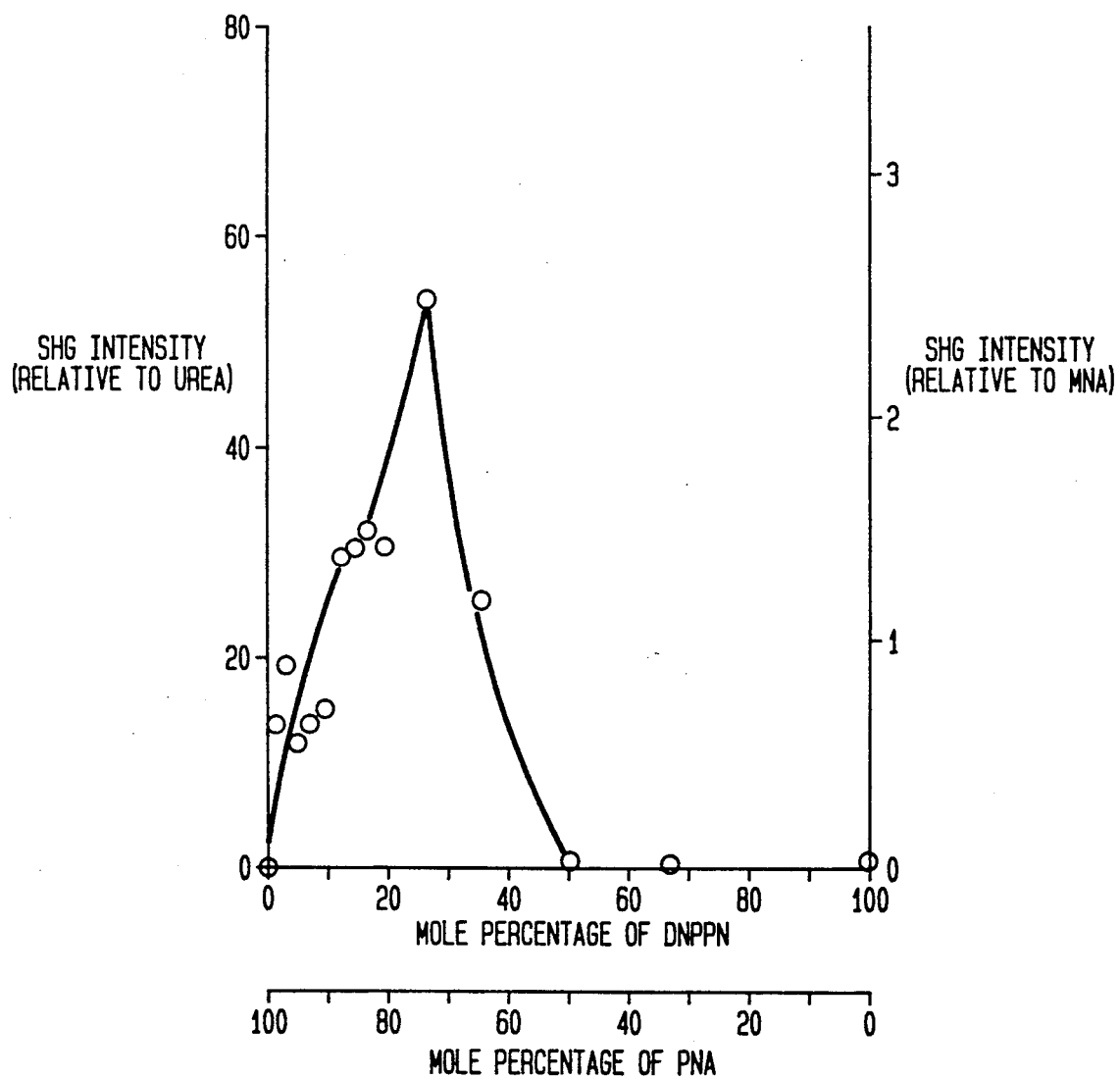
FIG. 8 is a graph showing the relationship between the SHG intensity and the mole percentages of DNPPN and PNA in the PNA/DNPPN system (i.e., compositions of nonlinear optical materials obtained in Example 8 of this invention).

The SHG efficiency of the compositions so obtained was then measured by the powder method. As shown in FIG. 8, extremely high SHG efficiency (about 60 times relative to urea) was observed for PNA/DNPPN ratios in the neighborhood of 3:1.

EXAMPLE 9

N,N'-bis(p-nitrophenyl)trimethylenediamine (i.e., N,N'-bis(p-nitrophenyl)-1,3-diaminopropane; hereinafter referred to as DNPTN) was synthesized in accordance with the method of the reference cited in the above description of Example 7. Then, compositions of nonlinear optical materials were prepared by the same method as used in Example 1, except that the ingredients used in the present case were DNPTN and PNA.

The SHG efficiency of the compositions so obtained was then measured by the powder method, and very high SHG efficiency (20 times or more relative to urea) was observed for PNA/DNPTN ratios in the neighborhood of 1:1.

EXAMPLE 10

(R)-N,N'-bis(p-nitrophenyl)-1-phenyl-1,2-ethanediamine (hereinafter referred to as DNPPEN) was synthesized from (R)-1-phenyl-1,2-ethanediamine in accordance with the same method as above. Then, compositions of nonlinear optical materials were prepared by the same method as used in Example 1, except that the ingredients used in the present case were DNPPEN and 2-amino-5-nitropyrimidine (hereinafter referred to as ANPD).

The SHG efficiency of the compositions so obtained was then measured by the powder method, and very high SHG efficiency (25 times or more relative to urea) was observed for ANPD/DNPPEN ratios in the neighborhood of 1:1.

EXAMPLE 11

Various compositions of nonlinear optical materials were prepared by the same method as used in Example 1, except that the ingredients used in the present case were m-cyanoaniline and NPEN.

The SHG efficiency of the compositions so obtained was then measured by the powder method, and high SHG efficiency (2–3 times relative to urea) was observed.

EXAMPLE 12

Various compositions of nonlinear optical materials were prepared by the same method as used in Example 1, except that the ingredients used in the present case were PNA and N-ethyl-4-nitroaniline (hereinafter referred to as NENA).

Figure 9:
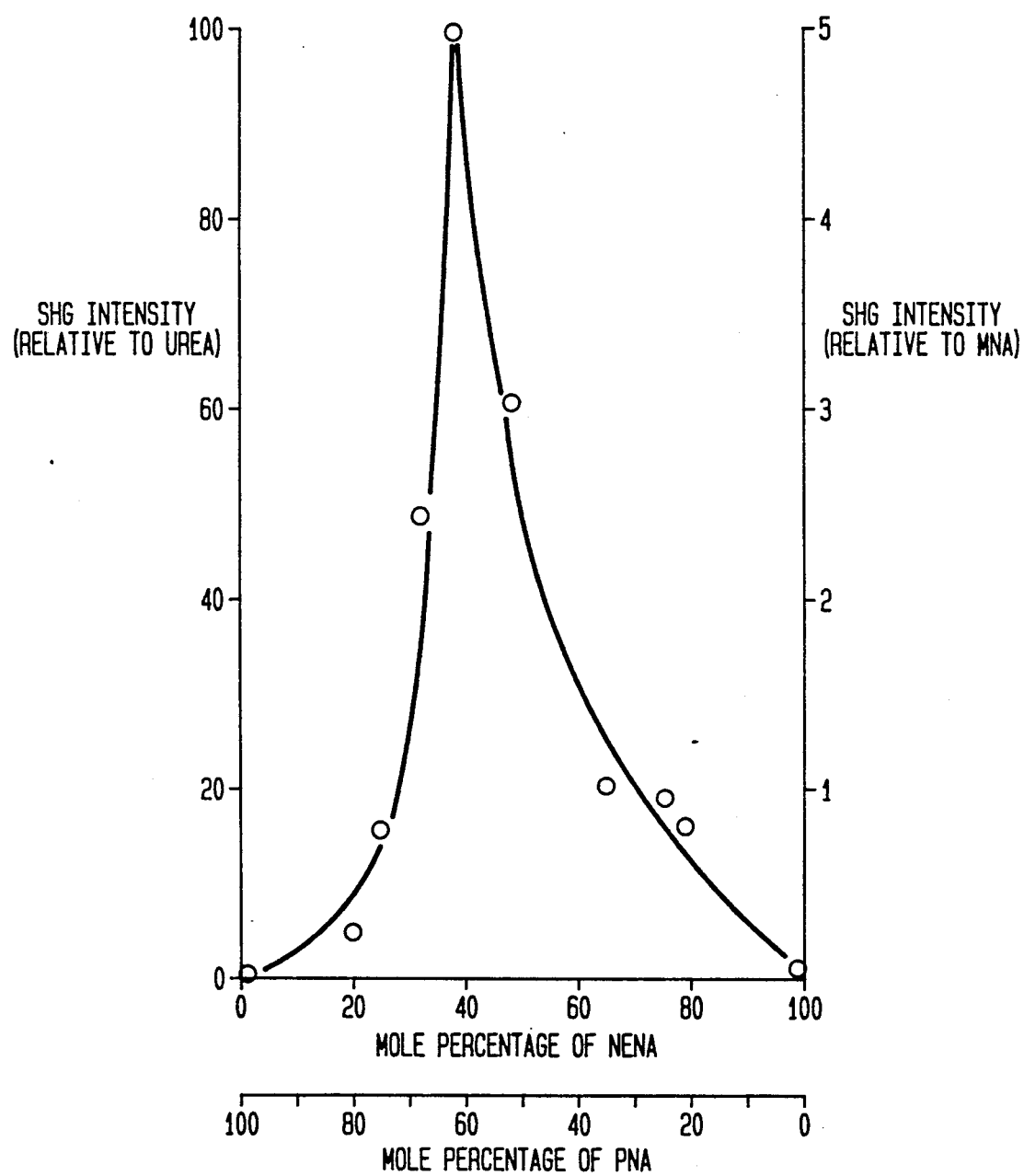
FIG. 9 is a graph showing the relationship between the SHG intensity and the mole percentages of NENA and PNA in the PNA/NENA system (i.e., compositions of nonlinear optical materials obtained in Example 12 of this invention).

The SHG efficiency of the compositions so obtained was then measured by the powder method. As shown in FIG. 9, extremely high SHG efficiency (approximately 100 times relative to urea) was observed for PNA/NENA ratios in the neighborhood of 3:2.

EXAMPLE 13

PNA and NPEN were separately pulverized to an average grain size not exceeding several microns. The two powders were then mixed at the PNA/NPEN ratio of 2:1. This powder mixture was dispersed in a 20 wt% aqueous solution of PVA. The dispersed solution so obtained was promptly coated onto a glass substrate by the blade method, thereby obtaining a recording medium consisting of the glass substrate and the layer of nonlinear optical material formed on this substrate. Patterns were recorded on this layer of nonlinear optical material by means of a thermal head of the type used in ordinary thermal recording. The entire surface of the recording medium bearing the latent image was then irradiated with a Nd:YAG laser beam (wavelength 1.064 μm), whereupon brilliant green luminescence was seen on the portions of the recording medium which had been heated by the thermal head. This fact indicates that, using the composition of this invention, SHG active layers of nonlinear optical materials can be formed on arbitrary device portions by the pattern-forming techniques employed in conventional thermal recording.

Moreover, using a carbon dioxide laser in place of a thermal head, and heating the recording medium bearing the latent image, permitted the impartation of SHG activity only to the portion of the recording medium which had been heated. Furthermore, applying acetone to dissolve a part of the layer of nonlinear optical material on the aforesaid recording medium, and then drying the layer, permitted the impartation of SHG activity only to the portion of the layer where acetone had been applied.

EXAMPLE 14

PNA and DNPEN in powder form were prepared separately. Next, these two powders were placed in two separate crucibles of a vapor deposition apparatus in such quantities that the molar ratio of the substances was 1:1. These two crucibles were then simultaneously heated under a vacuum, thereby fusing the PNA and DNPEN powders, effected vapor deposition of the substances onto a glass substrate and thus forming a film of thickness 1 μm. The SHG efficiency of the film of nonlinear optical material obtained in this manner was then measured by a procedure similar to the ordinary powder method, and the film exhibited a high efficiency of 25 times relative to urea. Since neither PNA or DNPEN alone exhibits any SHG activity whatsoever, this result demonstrates that, like fusion or solution, mixing of the aforesaid substances in the gaseous state by methods such as binary vapor deposition also permits the formation of SHG active compositions.

Applicable methods for the mixing of two or more organic compounds while still retaining an SHG inactive state are not limited to the powder mixing procedures mentioned in the foregoing examples and microcapsulation; other methods can also be used, such as vapor deposition or coating in two separate layers, etc. In these cases, it is not necessary to use polymers or other binding agents.

Furthermore, high SHG activity can be obtained by the dispersion in polymers of the composition containing organic compounds with a π-electron conjugated system provided by this invention, thus readily permitting the production of nonlinear optical elements.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A composition of nonlinear optical materials comprising:
   a first organic compound with a π-electron conjugated system containing an electron-donative substituent group and an electron-attractive substituent group; and
   a second organic compound of the general formula:

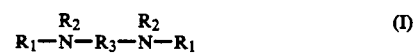

$$R_1-N(R_2)-R_3-N(R_2)-R_1 \quad (I)$$

wherein each $R_1$ is independently selected from the group consisting of hydrogen, amino, substituted amino, hydroxy, alkoxy, linear or branched alkyl, nitro, cyano, halogen, sulfonyl, carbonyl, acyl, alkoxycarbonyl, and unsubstituted or substituted aromatic or heterocyclic rings, with the proviso that at least one $R_1$ is an unsubstituted or substituted aromatic or heterocyclic ring; each $R_2$ is independently selected from the group consisting of hydrogen, amino, substituted amino, hydroxy, alkoxy, linear or branched alkyl, nitro, cyano, halogen, sulfonyl, carbonyl, acyl, and alkoxycarbonyl; and $R_3$ is a linear or branched alkylene group.

2. A composition of nonlinear optical materials according to claim 1, wherein said first and second organic compounds exhibit different crystal structures from each other.

3. A composition of nonlinear optical materials according to claim 1, wherein said first organic compound has an aromatic ring on which said electron-donative and said electron-attractive substituent groups are located at mutually para-positions.

4. A composition of nonlinear optical materials according to claim 1, wherein said first organic compound is nitroaniline.

5. A method for preparing a composition of nonlinear optical materials, comprising the steps of:

mixing two or more organic compounds by fusion, said organic compounds comprising a first organic compound with a $\pi$-electron conjugated system containing an electron-donative substituent group and an electron-attractive substituent group, and a second organic compound of the general formula:

wherein each $R_1$ is independently selected from the group consisting of hydrogen, amino, substituted amino, hydroxy, alkoxy, linear or branched alkyl, nitro, cyano, halogen, sulfonyl, carbonyl, acyl, alkoxycarbonyl, and unsubstituted or substituted aromatic or heterocyclic rings, with the proviso that at least one $R_1$ is an unsubstituted or substituted aromatic or heterocyclic ring; each $R_2$ is independently selected from the group consisting of hydrogen, amino, substituted amino, hydroxy, alkoxy, linear or branched alkyl, nitro, cyano, halogen, sulfonyl, carbonyl, acyl, and alkoxycarbonyl; and $R_3$ is a linear or branched alkylene group; and solidifying said mixture by cooling at a rate of at least 0.02° C./sec to form a composition of nonlinear optical materials.

6. A method according to claim 5, wherein said cooling rate is at least 1° C./sec.

7. A method for preparing a composition of nonlinear optical materials, comprising the steps of:

mixing two or more organic compounds by the use of a technique selected from the group consisting of solution and vapor deposition, said organic compound comprising a first organic compound with a $\pi$-electron conjugated system containing an electron-donative substituent group and an electron-attractive substituent group, and a second organic compound of the general formula:

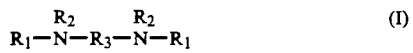

wherein each $R_1$ is independently selected from the group consisting of hydrogen, amino, substituted amino, hydroxy, alkoxy, linear or branched alkyl, nitro, cyano, halogen, sulfonyl, carbonyl, acyl, alkoxycarbonyl, and unsubstituted or substituted aromatic or heterocyclic rings, with the proviso that at least one $R_1$ is an unsubstituted or substituted aromatic or heterocyclic ring; each $R_2$ is independently selected from the group consisting of hydrogen, amino, substituted amino, hydrdoxy, alkoxy, linear or branched alkyl, nitro, cyano, halogen, sulfonyl, carbonyl, acyl, and alkoxycarbonyl; and $R_3$ is a linear or branched alkylene group; and forming a composition of nonlinear optical materials from said mixture.

* * * * *

UNITED STATES PATENT AND TRADEMARK OFFICE
CERTIFICATE OF CORRECTION

PATENT NO. : 5,009,815
DATED : April 23, 1991
INVENTOR(S) : Katsuya Wakita, et al.

It is certified that error appears in the above—identified patent and that said Letters Patent is hereby corrected as shown below:

In col. 10, lines 43-45, cols. 11 and 12, lines 14 and 15, change Formula (I) to read as follows:

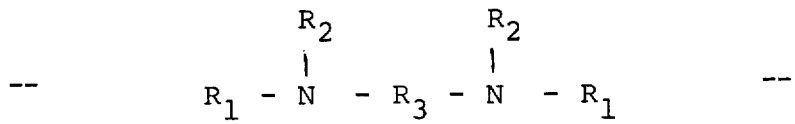

Signed and Sealed this

Sixth Day of October, 1992

Attest:

DOUGLAS B. COMER

Attesting Officer — Acting Commissioner of Patents and Trademarks